Feb. 6, 1951  H. L. LINK  2,540,745
METHOD OF PREPARING CREAM-STYLE CORN
Filed April 11, 1949
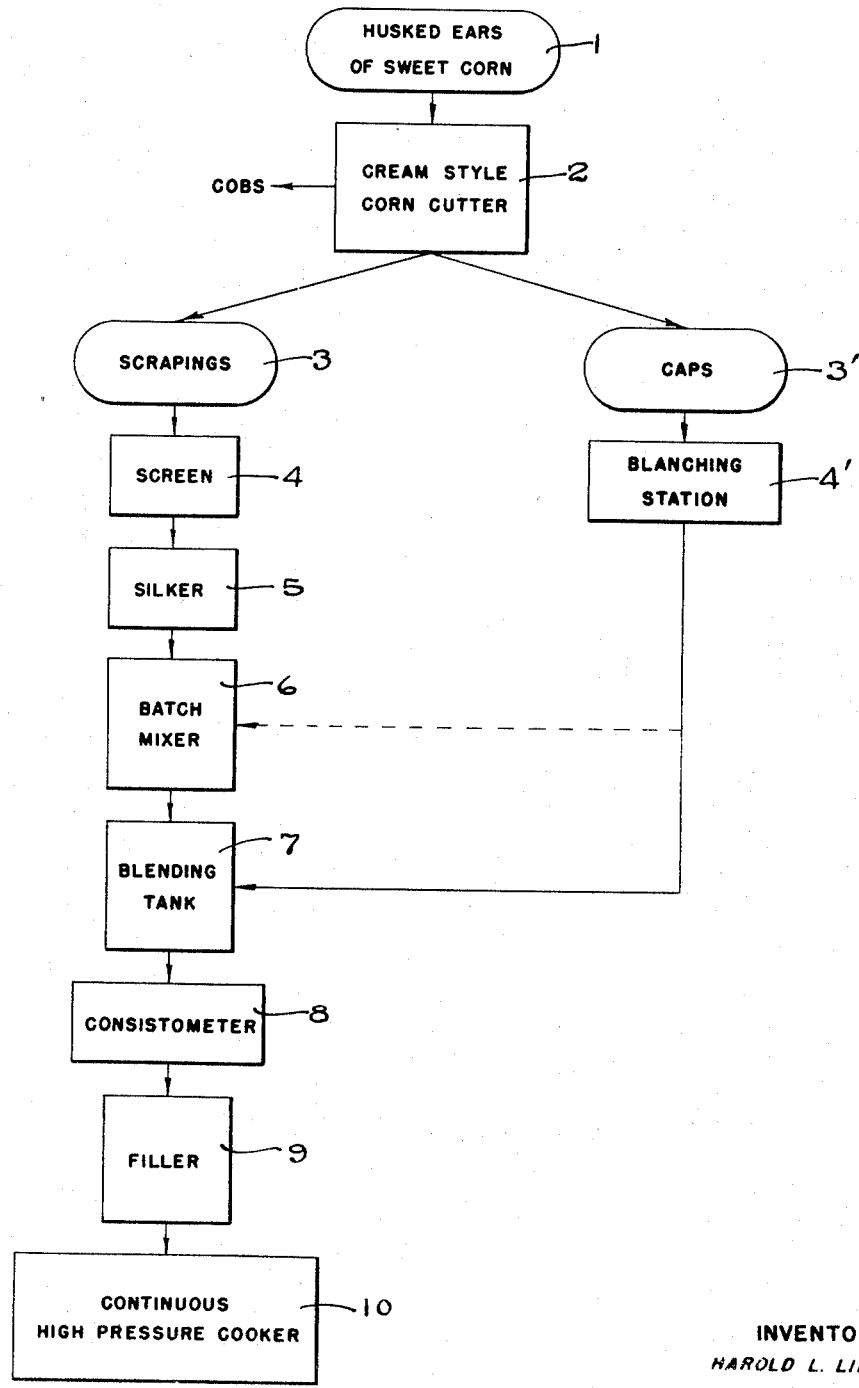
INVENTOR
HAROLD L. LINK
BY
ATTORNEY Patented Feb. 6, 1951

2,540,745

UNITED STATES PATENT OFFICE 2,540,745

METHOD OF PREPARING CREAM-STYLE CORN

Harold L. Link, Hoopeston, Ill., assignor to Food Machinery and Chemical Corporation, San Jose, Calif., a corporation of Delaware Application April 11, 1949, Serial No. 86,736

6 Claims. (Cl. 99—186)

The present invention relates to the preparation of "maize" or "corn," as it is more commonly known, for human consumption; more particularly the present invention relates to the preparation of the corn varieties known as "sweet corn" for preservation in sealed containers in the form of a food product known as "cream-style corn."

In the conventional method of preparing cream-style corn, ears of sweet corn are husked, trimmed and washed and are thereafter processed in a machine generally known as a "cream-style cutter," which cuts off the tops of the corn kernels and thereafter scrapes the interior from the kernel bases remaining in the cob. The kernel tops thus obtained provide the solid components of the food product and are generally known as the "caps," while the substance scraped from the interior of the kernel bases is generally known as the "scrapings" and is processed to form the cream portion of the product. The mixture of caps and scrapings produced by the action of the cream-style cutter is cleaned by screening out cob fragments, corn silk and other debris in specially designed equipment and is thereafter blended in apparatus termed "batch mixers" with a solution of salt, sugar and sometimes corn starch, according to a formula that varies, depending upon the maturity of the processed corn.

In large scale production the contents of several such batch mixers may then be combined in a large tank to secure an output of uniform quality, whereupon the consistency of the product is usually standardized in suitable consistometers by adding the proper amounts of water. The resultant product may then be filled into cans and sterilized within the cans, after they have been hermetically sealed.

Proper sterilization of cream-style corn requires relatively long cooking periods which produce changes in the corn product that harmfully affect its appearance and palatibility. Thus, extended application of high temperatures produces caramelization, especially in the regions adjacent to the container walls, which darkens the attractive color of fresh corn and destroys its delicate flavors, so that the marketability of the final product is appreciably impaired.

It has been found that the cooking period ordinarily required to properly sterilize cream-style corn may be materially shortened if the product is agitated during sterilization. Such agitation produces a more rapid heat penetration in that it increases the rate of heat transfer by the production of forced heat convection currents as compared to the mere conduction-type of heat transfer obtained when the product is sterilized in stationary condition. Thus, by the simple expedient of rolling or tumbling the cans or by conducting the product in a continuous flow through a tubular heat exchanger, the sterilization time may be decreased by as much as 50% or even more. However, while such a reduction of the sterilization period may be expected to produce conspicuous improvements in the color and flavor of the final product, sterilization of cream-style corn under agitation causes, almost invariably, coagulation of the cream portion of the mix; in fact, cream-style corn is frequently so sensitive in this respect that coagulation may even occur during stirring at the moderate temperatures in the batch mixer or the blending tank.

It is an object of the present invention to provide a coagulation-resistant cream-style corn.

Another object is to provide a sterilized cream-style corn of a color and flavor that closely resemble freshly made cream-style corn.

Yet another object is to provide a cream-style corn that may be heated under agitation without exhibiting harmful coagulation.

Furthermore, it is an object of the invention to provide a coagulation-resistant cream-style corn, of the type referred to, that does not contain any foreign ingredients.

An additional object is to provide a coagulation-resistant cream-style corn which contains no excess quantities of any of the ingredients normally present in cream-style corn.

Moreover, it is an object of this invention to provide a method of producing a cream-style corn in a manner which minimizes coagulation of its cream fraction.

An additional object is to provide a method of preparing a sterilized cream-style corn in such a manner that it retains substantially the color and flavor of freshly made cream-style corn.

Yet another object is to provide a method for the preparation of sterilized cream-style corn which, though involving agitation of the product at elevated temperatures to achieve proper sterilization without appreciable impairment of its color and flavor, maintains coagulation of its cream fraction at a minimum.

The invention is based upon the discovery that corn cream made from different kernel portions exhibit widely differing coagulation tendencies. Thus, in many corn varieties corn cream made from the kernel caps coagulates severely while corn cream made from the kernel bases is highly coagulation resistant, indicating that in these particular corn varieties the component or components responsible for coagulation are largely concentrated in the kernel caps. While I am unable to identify these components positively, I have observed that the kernel caps of these corn varieties exhibit usually a concentration of the protein normally present in the nutritive tissue of the endosperm. I am unable to state with certainty, however, whether it is said protein concentration by itself which increases the coagulation tendency of the corn cream merely by enriching it with coagulable matter, or whether the critical kernel portions contain a special coagulating agent in association with said protein concentration. In any case, the critical kernel portions that increase the coagulability of corn cream may readily be determined by a series of preliminary tests, if necessary, and in accordance with my invention I separate said critical kernel portions from the remaining body of the kernels and treat them in such a manner that they cannot exert their harmful influence when they are combined with the corn cream prepared from the remaining body portions of the kernels. For this purpose I subject said critical kernel portions to a heat treatment, preferably in the form of a blanching. I believe that such a treatment coagulates the protein concentrations contained in the critical kernel portions in situ and/or covers the open surfaces of said kernel portions with a layer of cooked starch so that there is no possibility for the coagulable substances and/or coagulating agents contained in said kernel portions to spill into, and harmfully act upon, the corn cream. My theory is borne out by the fact that particularly good results are obtained when great care is taken to limit bleeding or any other mechanical disintegration of said critical kernel portions before they are heat treated in the described manner.

Cream-style corns prepared in accordance with the invention may, without visible signs of coagulation, be subjected to such agitation during sterilization as will shorten the sterilizing period to an extent that preserves the bright color and pleasant aroma of freshly prepared cream-style corn.

In most of the corn varieties that I have tested so far the critical concentration of coagulable matter and/or coagulating agents occurs in the top portions of the corn kernels; this permits the process of my invention to be performed with a minimum of additional apparatus since in all such instances the conventional cream-style cutters may be employed to excise the critical kernel portions.

The accompanying drawing illustrates, in the manner of a flow chart, an exemplary process in accordance with my invention as applied to a corn variety of this type. The circle 1 designates husked ears of a corn known under the name of Golden Cross Bantam, grown in Illinois in 1948. Said corn was found to possess a very pronounced concentration of coagulable protein in the top portion of its kernels. Ears of this corn variety were delivered to a cream-style cutter represented by the block 2 which was adjusted to slice shallow caps from the corn kernels. As previously indicated, such cream-style cutters are well known in the art and will therefore be described in the briefest terms only. They comprise a plurality of blades which are arranged along a cylindrical surface and form an outwardly directed circular cutting edge. Said blades are mounted for rotation about a horizontal center axis and the corn ears are conducted coaxially against the rotating cutting edge and through the tubular hollow formed by the blades. Said blades are resiliently mounted and possess feelers which extend into the path of the approaching corn ears and continually vary the diameter of the tubular blade arrangement according to the varying diametrical sizes of the processed corn ears. Manually adjustable means are provided to set a definite difference between the diameter of the corn ears as indicated by the feelers and the diameter of the tubular blade arrangement so as to pre-establish the depth of the caps which said blades slice from the kernels of the corn ears. In practice the depth to which the kernels should be decapitated depends upon the nature of the corn to be processed. If the corn is found to be of the kind wherein the coagulation promoting matter is densely concentrated in the top of the kernel, as in the case of the corn employed in the exemplary process I am about to describe, the machine should be adjusted to slice very shallow caps from the kernels, while in cases where said substances are more evenly distributed over the interior of the endosperm, larger caps should be removed. Behind the described kernel capping arrangement the cream-style cutters possess mechanism composed of a plurality of blunt scraping knives arranged for rotation along a cylindrical surface in a manner similar to the above described capping blades. As the capped corn ears pass through the tubular hollow formed by said scraping knives, these knives scrape the interior from the decapitated kernel portions seated in the corn cobs, so that the cobs finally ejected from the machine are deprived of practically all matter that may be used for human consumption. In the exemplary process of my invention that I am about to describe, the cream-style cutter 2 was adjusted in such a manner that 12.8 pounds of corn ears of the type specified above were divided into 3.4 pounds of caps and 4.1 pounds of scrapings with the remaining 5.3 pounds representing the weight of the empty corn cobs and other debris.

While it has previously been the practice to collect both the caps and the scrapings in a common hopper arranged below the cream-style cutter, as they drop from the corn ears, I keep the caps and scrapings temporarily apart, as indicated by the diverging arrows leading from the block 2 to the circles 3 and 3' which designate the caps and the scrapings, respectively. Such separation may readily be accomplished by providing separate hoppers below the capping and scraping mechanisms. The scrapings may now be treated in the conventional manner to remove debris and corn silk, as indicated by the blocks 4 and 5, which designate a screening apparatus and a silker, respectively, and may then be conducted into the batch mixer 6 to be blended with the usual corn cream additives; i. e., water, salt, sugar and corn starch. Thus, the previously mentioned 4.1 pounds of scrapings were mixed with 0.133 gallon of water, 0.08 pound of corn starch and 0.13 gallon of syrup taken from a lot prepared by blending 700 pounds of sugar with 140 pounds of salt and 141 gallons of water. The scrapings and the described additives were gently stirred to obtain a uniform mixture and were heated to a temperature of 170°, whereupon the mixture was conducted into a tank, represented by the block 7, where it was combined with the contents of several other batch mixers that had been prepared in a similar manner. The contents of the tank were held at a temperature of 190° F.

In the meantime the corn caps 3' were conducted to a separate processing station 4', where they were subjected to a blanching treatment. In the exemplary embodiment I am about to describe, they were exposed to a bath of water, heated to a temperature of 212° F., for a period of 1 minute. As an alternative, the caps may be conducted through a steam chamber of corresponding temperature. For best results the caps should be carefully guarded against breakdown as they are transported from the cream-style cutter 2 to the heat treating station 4' and for this purpose I prefer to use flat conveyor belts since such belts cause a minimum of relative movement and friction or impact between bodies supported thereon and in this manner limit physical disintegration of the caps to a minimum. To avoid the hazards of transportation entirely, the caps may also be subjected to the described blanching treatment in the corn cutter itself. For this purpose a steam chamber or a hot water bath may be arranged below the capping mechanism or the capping knives may be heated so as to seal the open surfaces of the severed caps during the actual cutting operation and thus prevent any bleeding of protein matter from the caps. In fact, the kernel caps may even be blanched before they are sliced from the kernels, by applying a heat treatment to the exterior of the corn ears before, or while they are processed in the cream-style cutters. Such a treatment may take the form of a steam or hot water application, or of electrically produced heat, and must be carefully controlled as to temperature and duration so that the kernels be blanched only to the depth necessary to neutralize the main body of the coagulation-effecting matter, without de-naturing those parts of the kernel tissue that must be preserved in natural condition to yield a corn cream of proper palatability. When the kernel caps are heat treated prior to, simultaneously with, or shortly after the cutting operation, the requirement as to careful handling during subsequent transportation to further processing stations is far less stringent than when the caps are transported in an unblanched condition.

After the blanching operation the caps may be incorporated into the corn cream. For this purpose they may be added to the blending tank 7, as indicated by the arrow leading from block 4' to block 7, whereupon the contents of the blending tank should be gently stirred to distribute the caps uniformly in the mixture. The resultant product represents a cream-style corn that is highly coagulation resistant.

As another variant of the process of my invention the severed kernel caps, after having been carefully guarded from physical disintegration, may be added to the blending tank in unblanched condition, with the contents of the tank kept perfectly still and heated to a suitable blanching temperature, such as 200° F. In this manner the hot corn cream in the blending tank may be employed to blanch the kernel caps as required by the invention, without need for a separate heat treating station such as the station 4' in the accompanying chart. After the caps have been exposed to the heat of the corn cream for a sufficient time to properly set their interior tissues, the contents of the tank may be stirred to uniformly distribute the caps throughout the mixture, and the resultant product will exhibit substantially the same resistance to coagulation as the cream-style corn produced by subjecting the kernel caps to a blanching treatment in a separate process step.

From the blending tank 7 the mixture may be transferred to a consistometer 8 wherein its consistency is diluted to a standard value. The product is now ready for sterilization. In the exemplary process illustrated in the accompanying drawing the sterilization treatment was applied to the product after it had been filled into metal containers; for this purpose the mix was conducted to a filling turret 9 which filled it into metal cans #2 which have a diameter of $3\frac{7}{16}$" and a height of $4\frac{9}{16}$", and after the cans had been hermetically sealed, they were introduced into a sterilizer of the continuous motion type. Such sterilizers are arranged to advance the cans along a helical path and spin said cans about their main axes as they negotiate the lower sectors of said path. In this manner forced heat convection currents were set up in the interior of the cans which produced rapid and uniform heat penetration of their contents and thus permitted a very considerable reduction of the time required to render the corn product thoroughly sterile. In the exemplary process which I have so far described the temperature maintained in the sterilizer was of the order of 250° F., and the time required to properly sterilize the product was about 30 minutes, as compared with a period of 70 minutes required to sterilize cream-style corn from the same blending tank in stationary condition under otherwise identical circumstances.

The resultant product had not visibly coagulated, although it contained no ingredients foreign to ordinary cream-style corn; caramelization was negligible; the color of the product was a bright yellow and its flavor and palatability were substantially the same as that of freshly made cream-style corn, and were far superior to a control sample that had been sterilized in stationary condition.

While I have illustrated my invention with the aid of an exemplary process, it will be understood that I do not wish to be limited to any of the particular temperatures, times of exposure, proportions of additives or types of containers nor to the particular sequence of individual process steps mentioned in said example, all of which may be departed from without departing from the scope and spirit of my invention. Thus, while I have indicated that the blanched corn caps were added to the cream mix in the blending tank 7, they may also be combined with said mix at other stations in the process, such as, for instance, the batch mixer 6, as indicated by the broken arrow pointing from block 4' to block 5. Additionally, although I have illustrated my invention as applied to a corn variety of the type wherein the kernel caps appear to contain a concentration of coagulable and/or coagulation producing substances, it will be understood that the principles of my invention may logically be applied to corn varieties, wherein said substance or substances may be concentrated in other portions of the endosperm, by excising said other portions and treating them in the manner required by my invention; and while the effectiveness of my process may vary with different varieties of corn, depending upon the extent to which said coagulable and/or coagulation-producing substances are concentrated in a particular region of the endosperm, it will invariably be of beneficial effect, even if the endosperm exhibits no apparent concentration of said substances, because in all such cases the process of the invention when applied to the kernel tops will be effective to neutralize at least part of said substances and thus will inhibit or minimize coagulation of the corn cream at least to some extent. Furthermore, although my invention is of particular advantage in connection with sterilization methods which involve agitation of the food products, since it permits the application of such sterilization methods with the explained beneficial results where excessive coagulation would formerly have resulted, my invention may also be usefully employed in connection with stationary sterilization methods because it will minimize the ever present danger of coagulation in the batch mixers or the blending tanks. Moreover, while the illustrative process provided for sterilization of the cream-style corn within sealed containers, the product may also be sterilized in bulk in continuous flow tubular heat exchangers and thereafter be filled into containers under aseptic conditions.

Having thus described my invention and the manner in which it is to be performed, what I claim is:

1. The method of preparing a coagulation-resistant cream-style corn which comprises severing caps of a measured depth from the corn kernels, blanching said caps separately from the residual kernel portions, processing the scrapings from the residual kernel portions to form a corn cream, and adding said blanched caps to said cream.

2. The method according to claim 1 wherein said blanching comprises subjecting said caps for 1 minute to a water bath heated to a temperature of 212° F.

3. The method according to claim 1 wherein said blanching comprises conducting said caps through a steam chamber.

4. The process of preparing a sterilized cream-style corn resembling closely freshly made cream-style corn in color and flavor, which comprises severing the caps from the corn kernels, protecting said severed caps from disintegration, subjecting said caps to a blanching treatment separately from the residual kernel portions, scraping the tissue from said residual kernel portions, processing said tissue to form a corn cream, introducing said blanched caps into said corn cream, and sterilizing the resultant mixture under agitation.

5. The method of preparing a coagulation-resistant cream-style corn composed of kernel caps and a corn cream prepared from the scrapings of the kernel bases, which comprises applying heat to the outer surface of the corn ears to blanch the caps of the corn kernels to a measured depth while leaving the remaining kernel portions in natural condition.

6. The method of preparing a coagulation-resistant cream-style corn; which comprises severing caps of a measured depth from the kernels; processing the scrapings from the kernel bases to form a cream; heating said cream to a temperature of the order of 200° F.; conducting said kernel caps into said heated cream, while guarding them against physical disintegration; maintaining said heated cream, with said kernel caps immersed, in calm condition for a limited period of time; and thereafter stirring the mixture to distribute said caps evenly throughout said cream.

HAROLD L. LINK.

REFERENCES CITED

The following references are of record in the file of this patent:

UNITED STATES PATENTS

| Number | Name | Date |
|---|---|---|
| 1,940,773 | Sells | Dec. 26, 1933 |
| 2,000,892 | Lewis | May 7, 1935 |